(No Model.) 3 Sheets—Sheet 1.
J. C. BECKFELD & R. SIEGFRIED.
DRIVING MECHANISM FOR MOTOR CARS.
No. 421,476. Patented Feb. 18, 1890.
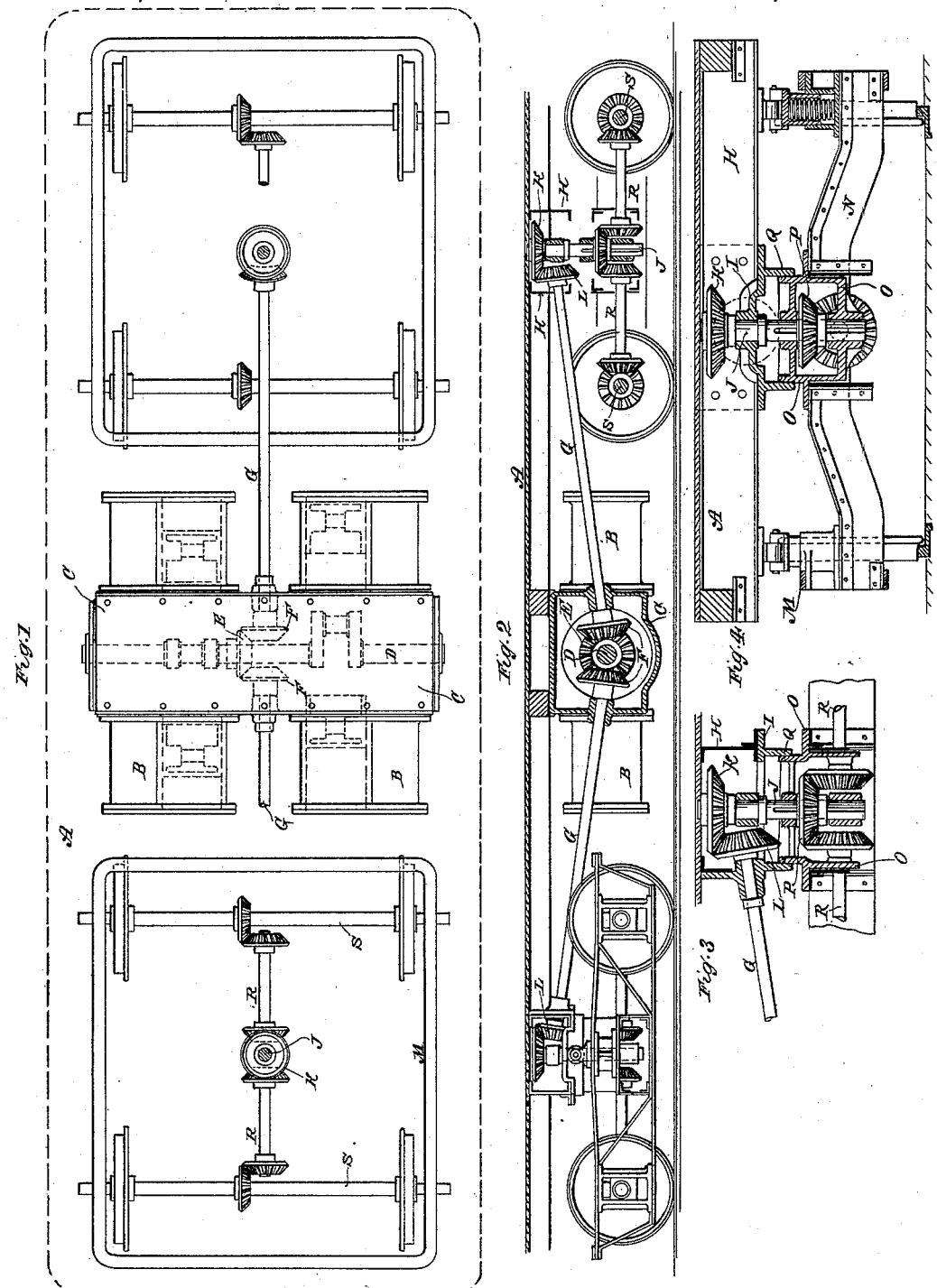
Witnesses
Robt. F. Gaylord
Ernest Hopkinson
Inventors
John Charles Beckfeld
Robert Siegfried
By their Attorneys
Duncan Curtis & Page

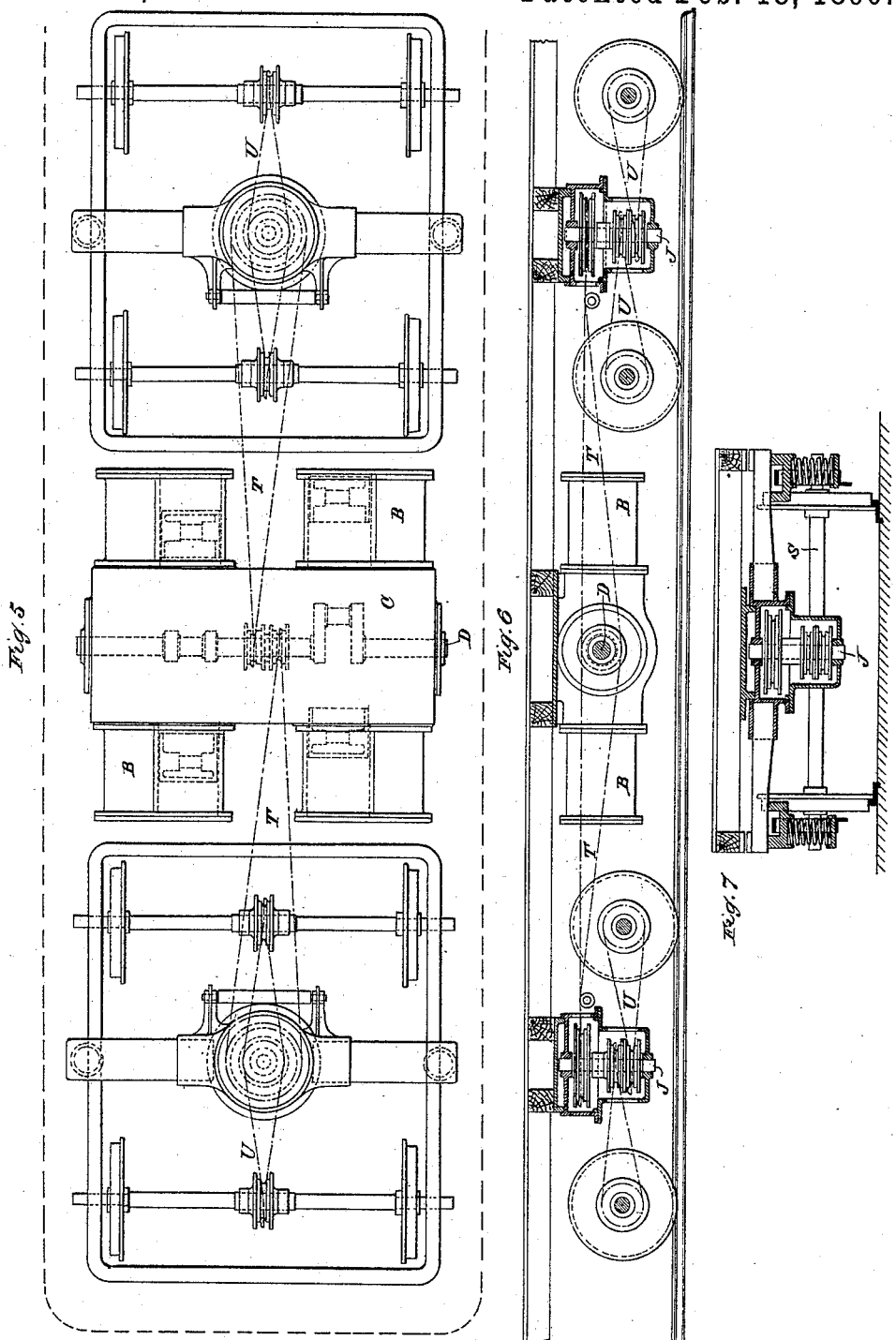

(No Model.) 3 Sheets—Sheet 3.
J. C. BECKFELD & R. SIEGFRIED.
DRIVING MECHANISM FOR MOTOR CARS.
No. 421,476. Patented Feb. 18, 1890.
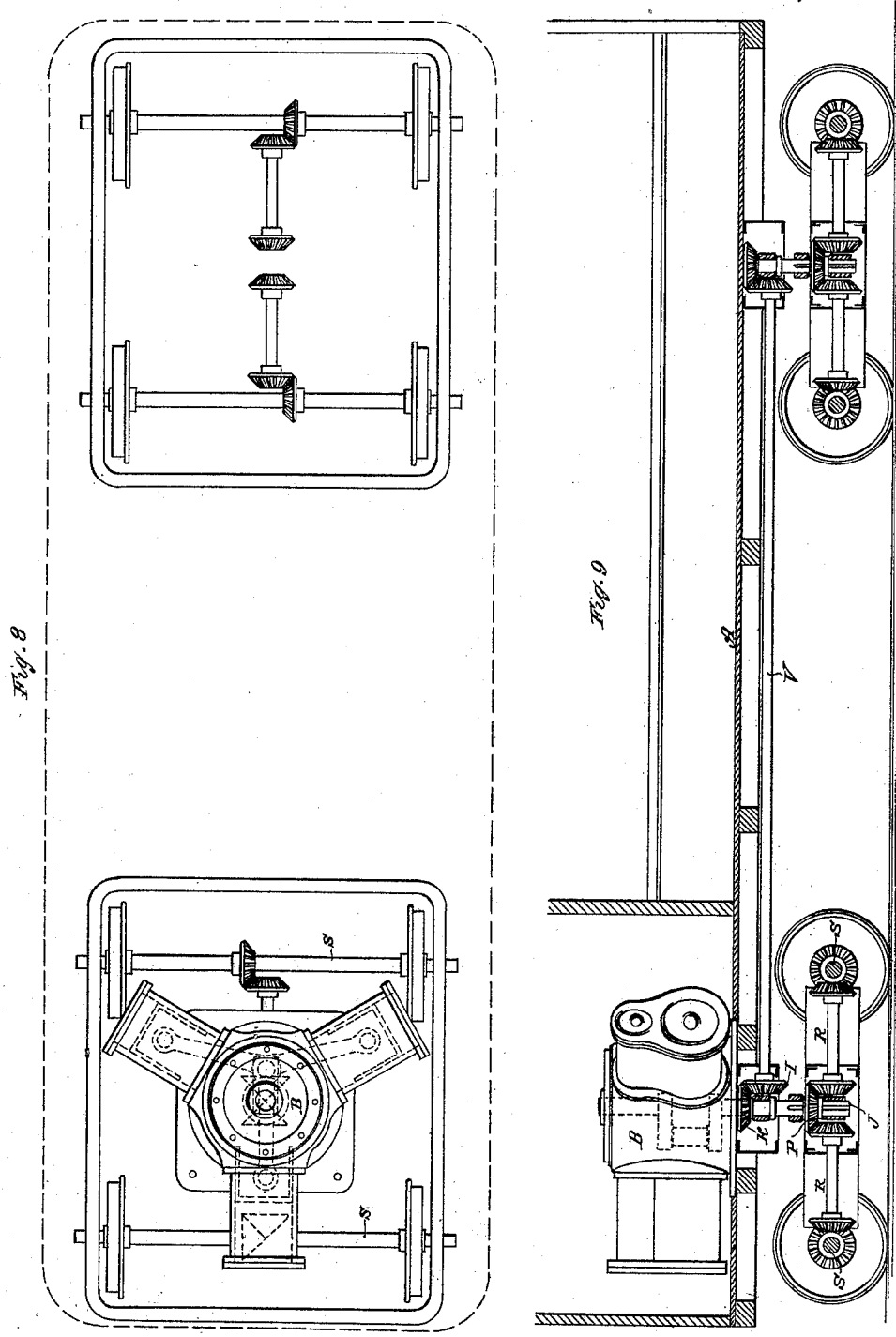
Witnesses
Robt. F. Gaylord
Ernest Hopkinson
Inventors
John Charles Beckfeld
Robert Siegfried,
By their Attorney
Duncan Curtis & Page

UNITED STATES PATENT OFFICE.

JOHN CHARLES BECKFELD AND ROBERT SIEGFRIED, OF ALLEGHENY, PENNSYLVANIA; SAID SIEGFRIED ASSIGNOR TO ALBERT SCHMID, OF SAME PLACE.

DRIVING MECHANISM FOR MOTOR-CARS.

SPECIFICATION forming part of Letters Patent No. 421,476, dated February 18, 1890.

Application filed July 12, 1889. Serial No. 317,285. (No model.)

*To all whom it may concern:*

Be it known that we, JOHN CHARLES BECKFELD, a citizen of the United States, and ROBERT SIEGFRIED, a citizen of the Republic of Switzerland, both residing at Allegheny, in the county of Allegheny and State of Pennsylvania, have invented certain new and useful Improvements in the Driving Mechanism for Motor-Cars, of which the following is a specification, reference being had to the drawings accompanying and forming a part of the same.

This invention consists in improvements in the gearing or other mechanism employed on tram-cars and similar vehicles for transmitting the motion of an engine or motor on the car to the axles and wheels.

The special object of the invention is the application of such intermediate driving mechanism to double-truck cars, or those which are mounted on separate trucks swiveled with the capability of movement independently of the car-body and provided with two or more axles, and in such application to provide for a positive transmission of the driving-power through connections which shall yield or accommodate themselves to the varying relative position of the car-body and the trucks.

We have illustrated the manner in which the invention is or may be carried into effect by means of the two forms of intermediate connections—viz., belts and gears, the latter being shown as applied under somewhat modified conditions in order to illustrate the general principle of the invention.

In the drawings, Figure 1 is a top plan view of the running-gear of a car, showing the general arrangement of the trucks and axles. Fig. 2 is a side elevation of the trucks and running-gear. Fig. 3 is an enlarged detail of the compensating gearing on one of the trucks. Fig. 4 is an enlarged end view of a truck. Fig. 5 is a top plan view of the running-gear provided with belting. Fig. 6 is a side elevation and part central section of the truck. Fig. 7 is an end view of one of the trucks. Fig. 8 is a top plan view of a motor and the trucks of a special form of car. Fig. 9 is a section through the body and trucks of the car indicated in Fig. 8.

Let A designate a car-body, and B a motor carried thereon, and by means of which the car is to be propelled. This motor may be of any desired kind—as, for instance, any one of the various forms of gas or air and gas, or compressed air or similar engine, or it may be an electro-magnetic motor—and its location or manner of support on the car is largely immaterial. For convenience we shall first consider the conditions existing in the case where the engine or motor is secured under the car-body between the forward and rear trucks. The motor may be attached to the car by the box-girder C, which also serves to support the journals of the driving-shaft D of the motor and to cover and protect such shaft and its connections. Upon this shaft is mounted the bevel driving-gear E, which meshes with similar gears F F on the inner ends of the shafts G G, these shafts being journaled in the box C.

Just over each truck and secured to the body of the car are the angle-bars H, which support the journal-frames I, on which are mounted the vertical shafts J, which constitute the center pins or king-bolts for the trucks, and which carry, fixed to their upper ends, the beveled gears K. In the frames J are also journaled the outer ends of the shafts G, which are geared to the vertical shafts by the gears L.

M represents the truck-frame, which may be of any approved form, and which supports the central cross-beams N. In the present case the trucks have yielding side connections with the car-body; but the form or position of these connections is not material. Various forms of trucks may be employed, and the attachment of their frames to the car-body may be differently effected. Between the cross-beams N of the trucks are hung the journal-boxes O of the lower ends of the vertical shafts J. These shafts at their lower ends pass through bevel-gears P, these gears being feathered on the shafts, and the ends of the shafts free in their bearings—that is to say, the journal-boxes O may have free vertical play on the shafts J as the trucks rise or fall. The boxes O are of such size that their upper or top portions fit movably in the downwardly-hanging flanged parts Q of the journal-frames I—that is, the upper and lower journal-frames telescope over the lower journal-boxes—and thereby serve to hold them in position and to guide them during their vertical play. Thus the function of these journal parts in their relation to the car body and trucks is the same as that of the common king-bolt or center pin.

R R are secondary shafts, which are journaled at their inner ends in the boxes O, being geared in the wheels P, and also being geared at their outer ends to the axles S of the trucks. The supports of the outer ends of these shafts R R are not shown; but various forms of suitable journal mechanisms will be obvious to those skilled in the construction of such machinery. By these means it will be seen we secure positively-acting driving-connections between the motor and the car-axles, and at the same time such connections are made to yield in accordance with or to conform to the various displacements of the trucks relative to the car-body, so that the transmission of power to the car-axles is not interrupted or made irregular.

In Figs. 5, 6, and 7 we show a form of power-transmitting connections between the motor and the axles of the two trucks which is a modification of that already described. Here the vertical shafts that transmit power to the axles and their journal-boxes are supported from the body of the car, as before; but their connection with the motor-shaft is effected by belts T T and their connection to the car-axles by belts U U, there being, of course, suitably-arranged pulleys or belt-wheels substituted for the bevel-gears of Figs. 1 to 4. The kinds of belting will be in accordance with the work to be done, and chains and sprocket-wheels may be the best form of such kind of means for power transmision.

In Figs. 8 and 9 another modification is shown. Here the motor is shown as located in a compartment of the car and its driving-shaft is continued through the floor of the car and serves as one of the vertical shafts J of Figs. 1 to 4. Between this shaft and the vertical shaft of the other truck extends a horizontal shaft V, so that the axles of the trucks are all driven together. This system of connection is practically the same as that of the first four figures of the drawings, except that the driving-power is applied thereto at a different point.

Still other modifications will appear to those skilled in these constructions; but we have shown sufficient to illustrate the principle of our improvements.

What we claim is—

1. The combination, in a motor-car, of the car-body and motor carried thereby, and vertical shafts capable of rotation and forming the king-bolts or center pins for the trucks, the two trucks movable vertically upon the said shafts, the shafts being in gear with the motor and with the axles of the car, with provision for play or vertical movement of the car and trucks, as set forth.

2. The combination, in a motor-car, of the car-body and a motor carried thereon, the trucks of the car, vertical shafts forming the center pins or king-bolts for the trucks, gear-wheels on said shafts that revolve therewith and have vertical motion thereon, and shafts connecting the motor with said vertical shafts and with the car-axle.

3. In combination with the car-body and the motor secured thereto, the vertical shaft J, supported in journals attached to the car-body and forming the king-bolts for the trucks, the shafts G, and the gearings, the vertically-moving gear-wheels P on the king-bolts, the trucks and their axles, and the secondary shafts connecting them with the king-bolts J.

4. In combination, the vertical king-bolts J, mounted in the journal-frame I, the axles, the journal-box O, carried thereon and arranged within and guided by the journal-frame, the gear P, having vertical motion on the bolt J, and the secondary shaft R and their gears.

5. The combination, in a motor-car, with the car-body and a motor carried thereon, of the trucks of the car and the motor-shaft forming the center pin or king-bolt for one of the trucks, and flexible connections between the same and the axles of the trucks for the transmission of power, as set forth.

6. The combination, in a motor-car, with the car-body and king-bolts journaled therein and capable of rotation, of two trucks connected to the car by the said bolts, a motor carried by the car, positive gearing-connections between said motor and the king-bolts, and yielding gearing-connections between the king-bolts and the axles of the trucks, whereby vertical play or movement of said trucks on the bolts is permitted, as set forth.

JOHN CHARLES BECKFELD.
ROBERT SIEGFRIED.

Witnesses:
J. M. TATE, Jr.,
W. D. UPTEGRAFF.